United States Patent [19]
Bartholomäus et al.

[11] Patent Number: 4,519,573
[45] Date of Patent: May 28, 1985

[54] DEVICE FOR THE ACTUATION OF A SLIDE VALVE

[75] Inventors: Reiner Bartholomäus, Neuendorf, Fed. Rep. of Germany; Michel Rivolier, Bron, France

[73] Assignee: Mannesmann Rexroth GmbH, Fed. Rep. of Germany

[21] Appl. No.: 481,316

[22] Filed: Apr. 1, 1983

[30] Foreign Application Priority Data

Apr. 21, 1982 [DE] Fed. Rep. of Germany ....... 3214845

[51] Int. Cl.[3] .............................................. F16K 31/12
[52] U.S. Cl. ........................................ 251/30; 251/25; 251/129; 137/625.64; 137/596.16
[58] Field of Search ....................... 251/30, 31, 32, 24, 251/129, 28, 25; 137/116.3, 596.16, 625.64

[56] References Cited

U.S. PATENT DOCUMENTS 3,428,063 2/1969 Plotkin et al. .................... 251/30 X
3,477,466 11/1969 Sturm ................................ 251/30 X

*Primary Examiner*—Larry Jones
*Attorney, Agent, or Firm*—Harness, Dickey & Pierce

[57] ABSTRACT

A slide valve, in particular the piston of a switching valve, is actuated in both directions of adjustment by a pressure medium which acts on the annular face and/or the circular face of a regulating piston fixed one-sidedly to the slide valve. The equalization of the differing controlling forces, determined by the different sized surfaces of the regulating piston that are subjected to pressure, is achieved by means of a spring or by an hydraulic counterforce.

9 Claims, 4 Drawing Figures

DEVICE FOR THE ACTUATION OF A SLIDE VALVE

BACKGROUND OF THE INVENTION

The invention is concerned with a device for actuation of a slide valve displaceable in a bore of a housing, in particular for actuation of the piston of a switching valve, and including first and second regulators for displacement of a control piston.

It is known how regulators can be fitted, one at each end of the slide valve, on the housing. This produces no difficulties, as the leading surfaces of the slide valve that are acted upon by the pressure from the regulators are of equal magnitude, so that equal controlling forces are produced in each direction of motion of the slide valve.

If however the actuation of the slide valve in both directions is to take place from one side, because the opposite end of the slide valve is either inaccessible or has to be kept free for the connection of other fittings, then both regulators must be fitted at one end, and difficulties arise in so far as the controlling forces that act upon the slide valve have to be of equal magnitude in both directions of adjustment.

The basic object of the invention, therefore, consists in configuring the device of the kind first referred to in such a way that, when both regulators are fitted on one side, the controlling forces in both directions of motion of the slide valve are, by simple means, made equal.

SUMMARY OF THE INVENTION

According to a first aspect of the invention, the difference between the annular face and the circular face of the regulating piston which, when pressures are equal at any time, leads to unequal controlling forces, is equalised as a result of the fact that, when pressure acts upon the circular face, i.e. the larger loading surface, an equaliser spring is compressed in addition, which spring is tuned in such a way that the adjusting force acting on the slide valve is equal to the adjusting force that is evoked by the other regulator when the annular face of the regulating piston is acted upon, in which situation the equaliser spring is inoperative in the direction of motion of the slide valve caused by this regulator.

An appreciable advantage can be seen in the fact that both regulators are of fully identical construction and deliver the same pressure when signals for the magnetic operation thereof are equal; and that the equalisation of the distinct control forces is undertaken by an equaliser spring.

In a second solution according to the invention, when the circular face of the regulating piston is acted upon, then the pressure delivered by the allotted regulator is simultaneously transferred also on to the annular face, and therefore produces a counterpressure. As the surface ratio of annular face to circular face amounts to 1:2, the result is an equalisation of the distinct controlling forces in a purely hydraulic mode, so that the equaliser spring can be omitted. The adjusting forces in both directions of motion of the slide valve are therewith equal.

The device according to the invention is suitable for actuation of piston valves not only of switching valves but also of other valves, and in particular also for the actuation of the pistons of variable pumps.

The embodiments of the invention are illustrated in detail with reference to the drawings.

DETAILED DESCRIPTION OF THE PREFERRED EMBODIMENTS

Figure 1:
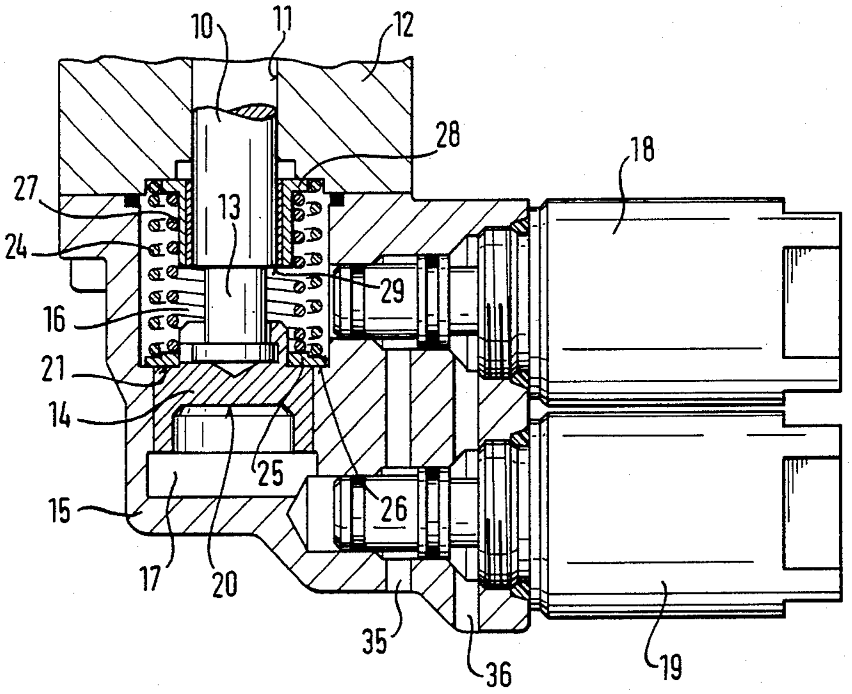
FIG. 1 is a sectional view of an actuation device for the piston valve of a switching valve.

In accordance with FIG. 1, a piston valve 10 is slideably mounted within a bore 11 of a valve housing 12. The pressure medium connections to and from the device being controlled are not represented. The slide valve 10 could also be connected with the regulator of a variable pump. A regulating piston 14 which has a greater diameter than the piston valve 10 is fixed to an extension 13 of the piston valve 10. The regulating piston 14 separates two pressure chambers 16 and 17 in a housing 15. The pressure in the control chamber 16 is controlled by a regulator 18 and the pressure in the control chamber 17 by a regulator 19.

The pressure in the control chamber 17 acts on the circular face 20 of the regulating piston 14, while the pressure in the control chamber 16 acts on the annular face 21 of the regulating piston, the annular face being formed by the difference between the external diameter of the regulating piston and the diameter of the piston valve 10.

An equaliser spring 24 is supported with its one end on a ledge of the housing 12 and with its other end on a spring abutment 25, which is pressed by the spring 24, against a housing ledge 26, by which the regulating piston 14, engaged by the spring abutment and with it the piston valve 10, are urged into the initial position shown. In addition to the equaliser spring 24, a restoring spring 27 is provided, one end of which is likewise supported on the spring abutment 25, and the other end of which is supported on a further spring abutment 28, which, in the initial position shown, is connected by a collar 29 on the piston valve and engages the ledge of the housing 12.

Figure 2:
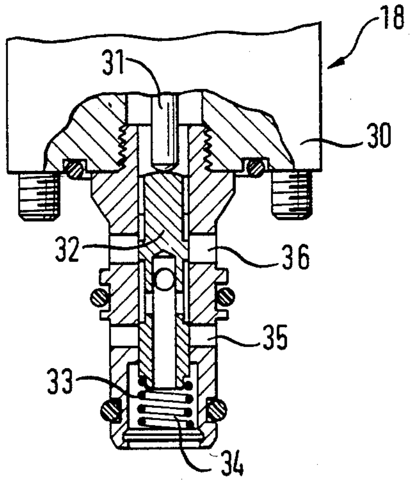
FIG. 2 is a section view through a pressure reducing valve acting as a regulator.

In FIG. 2 a section through one of the regulators 18 or 19 is shown. The regulator consists of proportional solenoid 30, the push rod 31 of which acts, in known manner, on a piston 32, which operates against a pressure spring 33. The setting of the pressure at a pressure connection 34, which is connected to the control chamber 16 or the control chamber 17, is effected in dependence on the current by actuation of the proportional solenoid 30. The push rod 31 of the solenoid pushes the control piston 32 against the pressure spring 33. Pressure medium then flows from the junction 35, which is connected to a source of pressure medium, to the junction 34. If the sum of the forces of starting pressure times piston surface plus spring tension exceeds the magnetic force proportional to the magnetising current, then the piston 32 is brought back in the direction of its starting position, so that from the junction 34 a portion of the pressure medium can flow away to the tank connection 36 for as long as it takes until equilibrium of force on the piston 32 is established.

If pressure medium is led into the chamber 16 in this way, through being controlled by the regulator 18, and acts on the annular face 21 of the regulating piston 14, then the piston valve 10 is forced downwards in process of which only the restoring spring 27 is compressed, as the spring abutment 25 is held fast to the housing ledge 26. The equaliser spring 24 remains inoperative.

If on the contrary the regulator 19 is actuated then the pressure in the chamber 17 acts on the circular face 20 and the piston valve 10 is forced upwards, in process of which the restoring spring is likewise again compressed, but so too, in addition to the restoring spring, is the equaliser spring 24, which is supported by the housing ledge 12. The equaliser spring 24 must be of such dimensions as to equalise the difference of the controlling forces which arises from the fact that the equal pressures directed in by the regulators act on loading areas of different magnitudes, i.e. on the one hand on the circular face 20 and on the other hand on the annular face 21 of the regulating piston 14.

Figure 3:
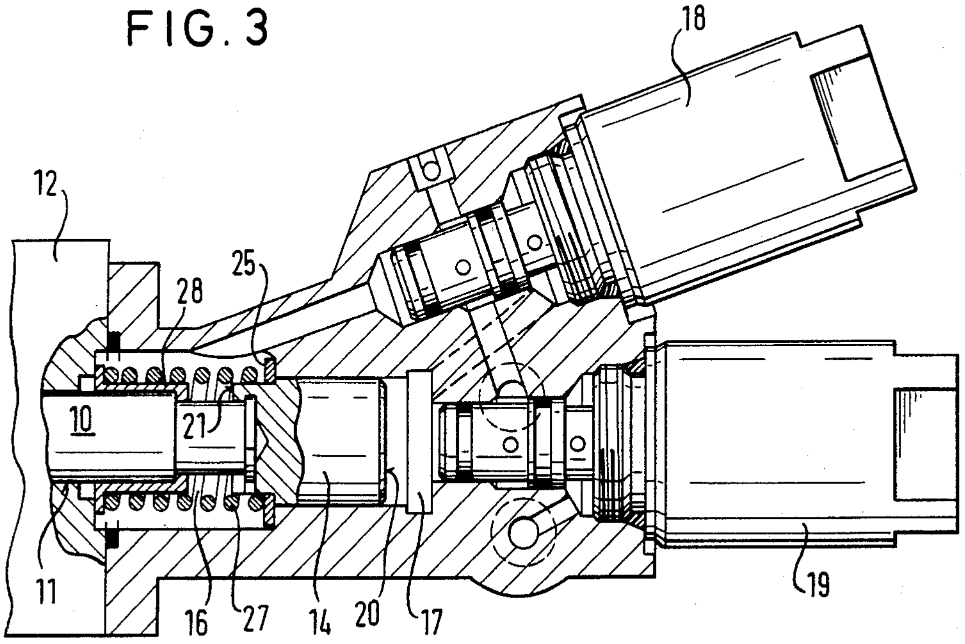
FIG. 3 is a section view through an actuation device in a modified embodiment with hydraulic equalisation.

In FIG. 3 a modified embodiment is depicted, in which likewise a slide valve 10 is connected with a regulating piston 14 which separates a control chamber 17 from a control chamber 16. Each control chamber is again connected to a regulator 18 or 19. In the control chamber 16 a restoring spring 27 is again fitted between the regulating piston 14 and the piston valve 10, and is supported with one end on the spring abutment 25 already illustrated, and with its other end on a spring retainer 28. An equaliser spring is not provided for.

Figure 4:
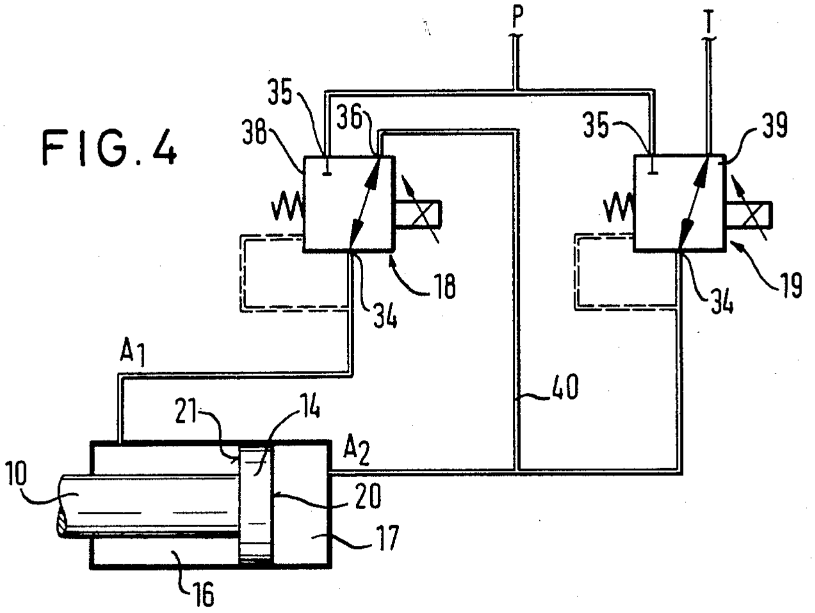
FIG. 4 is a circuit diagram of the embodiment shown in FIG. 3.

Rather, the equalisation of the distinct controlling forces is achieved by means of the connections of the pressure reduction valves illustrated in FIG. 4. In FIG. 4 the regulating piston 14 and the control chambers 16 and 17 are shown in skeleton form. The regulators 18 to 19 are provided with pressure reduction valves 38/39, described in relation to FIG. 2, with their connections labelled in FIG. 4 with the reference symbols used in FIG. 2. When the regulator 18 is activated, the junctions 35 and 34 at the pressure reduction valve 38 are linked together, so that pressure medium passes into the control chamber 16 and forces the regulating piston 14 to the right, whereby the volume displaced flows away to the tank connection 36 of the pressure reduction valve 38.

If on the contrary the regulator 19 is actuated and actuates the pressure reduction valve 39, then pressure medium passes from junction 35 via 34 not only into the control chamber 17 but also, via the branch pipe 40 and the junctions 36 and 34 of the undirected pressure reduction valve 38 into the control chamber 16. If the relationship of the annular face 21 to the circular face 20 is as 1 to 2, then given equal pressures of the pressure medium directed in by the regulator 18 or 19, the controlling forces on the regulating piston 14 are of equal magnitude.

We claim:

1. A device for positioning a slide valve displaceable in a bore of a housing and subject to the force of a restoring spring, in particular for actuation of the piston of a switching valve, the device comprising a first regulator, a second regulator and a regulating piston fixed to the slide valve and having a circular face directed away from the slide valve and acted upon by pressure from the first regulator, and an annular face directed towards the slide valve and acted upon by pressure from the second regulator, and an equaliser spring acting on the annular face of the regulating piston to equalise the unequal controlling forces acting on the different sized annular and circular faces of the regulating piston, said equaliser spring being mounted with one end engaging part of the housing and the other end engaging a spring abutment which is urged against the regulating piston and against a ledge on the housing.

2. A device according to claim 1, wherein each regulator is magnetically controlled.

3. A device according to claim 1, wherein the restoring spring is fitted concentrically of the equaliser spring, the restoring spring engaging at one end on said spring abutment and at the other end engaging a retainer mounted on the slide valve and within said housing.

4. A device for positioning a slide valve displaceable in a bore of a housing and subject to the force of a restoring spring, in particular for actuation of the piston of a switching valve, the device comprising a first regulator, a second regulator and a regulating piston fixed to a front surface of the slide valve, the regulating piston having a circular face directed away from said front surface and acted upon by pressure from the first regulator, and an annular face directed towards said front surface and acted upon by pressure from the second regulator, the pressure from the first regulator, in order to equalise the unequal controlling forces acting on the different sized annular and circular faces, acting additionally upon the annular face, the area of which mounts to substantially half that of the circular face.

5. A device according to claim 4, wherein each regulator comprises a magnetically controlled pressure reducing valve which has a connection leading to the regulating piston which may be selectively connected by the regulator to a pressure medium source or to a tank, the tank connection of the second regulator being connected to a junction of the first regulator which leads to the circular face of the regulating piston.

6. A device for positioning a slide member along a bore of a housing subject to the force of a restoring spring, comprising:

- a piston fixedly secured to said slide member and defining a first and second chamber in said housing on opposite sides of said piston, said piston having a circular face directed toward said first chamber and an annular face directed toward said second chamber;
- a first regulator in communication with said first chamber and a second regulator in communication with said second chamber, each of said regulators being able upon actuation to independently communicate pressure from a common pressure source to their respective chambers and thereby control the longitudinal position of said slide member within said bore of said housing;
- spring means for equalising the unequal controlling forces acting on opposite sides of said piston due to the different sizes of said circular and annular faces.

7. The device according to claim 6, wherein said spring means is an equaliser spring which is mounted within said housing such that it is inoperative when said second regulator is actuated to communicate pressure from said pressure source to said second chamber.

8. The device according to claim 7, wherein one end of both said restoring spring and equalise spring engage an annular spring abutment whose movement is limited in one direction by a ledge of said housing.

9. The device according to claim 8, wherein the end of said equaliser spring opposite to said spring abutment engages said housing, while the corresponding end of said restoring spring engages a spring retainer which is urged against a ledge in said housing.

* * * * *